United States Patent [19]

Berard

[11] Patent Number: 4,956,797
[45] Date of Patent: Sep. 11, 1990

[54] FREQUENCY MULTIPLIER

[75] Inventor: Paul M. Berard, Phoenix, Ariz.

[73] Assignee: Siemens Transmission Systems, Inc., Phoenix, Ariz.

[21] Appl. No.: 219,511

[22] Filed: Jul. 14, 1988

[51] Int. Cl.$^5$ .................. G06F 7/52; H03K 23/64
[52] U.S. Cl. .................... 364/703; 377/47; 307/219.1; 307/471; 328/20
[58] Field of Search .......... 377/47, 48; 328/20, 328/25, 60, 55, 58; 307/219.1, 471, 529; 364/703

[56] References Cited

U.S. PATENT DOCUMENTS

| | | | |
|---|---|---|---|
| 3,786,357 | 1/1974 | Belle Isle | 328/38 |
| 3,992,612 | 11/1976 | Dunn | 377/47 |
| 3,993,957 | 11/1976 | Davenport | 328/38 |
| 4,217,639 | 8/1980 | Hartley et al. | 364/200 |
| 4,244,027 | 1/1981 | Shai | 377/47 |
| 4,349,887 | 9/1982 | Crowley | 328/14 |
| 4,458,329 | 7/1984 | Remy | 307/529 |
| 4,542,420 | 9/1985 | Kozlik et al. | 360/42 |
| 4,721,905 | 1/1988 | Mehrgardt | 328/133 |

FOREIGN PATENT DOCUMENTS 0083435 5/1983 Japan ..................... 377/47
1145472 3/1985 U.S.S.R. ................. 377/47

OTHER PUBLICATIONS

Research Disclosure–"Clock Frequency Multiplication by Powers of Two" Research Disclosure–Sep. 1987–No. 281–p. 1.
Hernandez–"Frequency Multiplier Using Delay Circuits" IBM Technical Disclosure Bulletin–vol. 26–No. 3A–Aug. 1983–pp. 990-991.
A. X. Widmer, "Pulse Pattern Generator, Counter Timing Circuit", IBM Tech. Discl. Bulletin, vol. 6, No. 9, Feb. 1964.

Primary Examiner—Stanley D. Miller
Assistant Examiner—Tai V. Duong
Attorney, Agent, or Firm—Jeffrey P. Morris

[57] ABSTRACT

A frequency multiplier is disclosed for producing an output signal having a frequency greater than the frequency of an input signal by a factor $(1+N/M)$. The frequency multiplier comprises an input terminal and an output terminal; and a plurality of frequency multiplying stages, coupled between the input and output terminals, each producing an output signal having a frequency greater than the frequency of its input signal by a factor having the general form $(1+1/P)$.

6 Claims, 1 Drawing Sheet

FREQUENCY MULTIPLIER

The present invention relates to a frequency multiplier which produces a signal having a frequency which is a fixed factor higher than the frequency of an input signal.

It is sometimes desirable in electronic circuitry to produce a clock signal which has a frequency which is greater, by some fixed factor, than the frequency of an input clock signal.

U.S. Pat. No. 4,542,420, issued Sept. 17, 1985 to Kozlik et al. discloses a frequency doubler circuit, comprising an exclusive-OR gate and a delay circuit. By cascading these circuits, clock signals may be produced which have frequencies greater than the frequency of the input signal by a factor of $2^N$ where N is the number of cascaded frequency doubler circuits.

FIG. 1 illustrates a known frequency multiplier. An input terminal 105 of the frequency multiplier is coupled to a source (not shown) of an input clock signal. The input terminal 105 is coupled to a first input terminal of an exclusive-OR gate 110 and an input terminal of a divide-by-P circuit 120, which may be, for example, a count-to-P counter. An output terminal of the divide-by-P circuit 120 is coupled to a second input terminal of the exclusive-OR gate 110 through a delay circuit 130. Delay circuit 130 may delay the signal at its input terminal by approximately one-quarter of the period of the input signal, and may be, for example, a pair of serially coupled inverters. An output terminal of the exclusive-OR gate 110 is coupled to an output terminal 115 of the frequency multiplier and produces a signal having a frequency greater than the frequency of the input signal by a factor of $(1+1/P)$.

In operation, divide-by-P circuit 120 produces one pulse at its output terminal in response to P pulses received at its input terminal. When this pulse is absent, exclusive-OR gate 110 passes pulses from its input terminal to its output terminal unchanged. When the pulse is present at the output of divide-by-P circuit 120, i.e. during the P-th clock period, it is delayed in delay circuit 130 for a period of time approximately corresponding to one quarter the period of the signal at input terminal 105.

During the first quarter of the P-th clock period, exclusive-OR gate 110 passes the clock pulse from input terminal 105 through to output terminal 115 without change. During the second quarter of the P-th clock period, the delayed pulse from divide-by-P circuit 120 arrives at the second input terminal of exclusive-OR gate 110. The presence of the delayed pulse at the second input terminal conditions the exclusive-OR gate to invert the pulse still present at its first input terminal. The output of exclusive-OR gate 110, thus, falls. During the third quarter of the P-th clock period, the pulse at input terminal 105 falls. This is inverted by exclusive-OR gate 110, which produces another output pulse at its output terminal. During the fourth quarter of the P-th clock period, the delayed pulse from divide-by-P circuit 120 falls. This conditions the exclusive-OR gate 110 to, again, pass the signal at its input terminal to its output terminal unchanged. Consequently, the output pulse from exclusive-OR gate 110 falls again.

A single pulse is produced at the output of exclusive-OR gate 110 for each pulse supplied to its input terminal with the exception of every P-th input pulse during which two output pulses are produced. That is, P+1, output pulses are produced for each P input pulses. The ratio of the output to input frequencies, therefore, is $$(P+1)/P = 1 + 1/P. \tag{1}$$

U.S. Pat. No. 3,993,957, issued Nov. 23, 1976 to Davenport discloses a circuit which can produce a clock signal having a frequency greater than the frequency of an input signal by a factor M/N. This circuit comprises the serial connection of a divide-by-N circuit (for example, a digital counter) and a multiply-by-M circuit. The multiply-by-M circuit comprises a tapped-delay line and an exclusive-OR gate tree. The number of taps in the tapped delay line is $(M-1)$. These $(M-1)$ signals are supplied to $(M-1)$ inputs of the exclusive-OR gate tree.

Such a tapped delay line is relatively expensive, must be customized to have $(M-1)$ taps producing signals delayed by respective intervals of $N/2Mf_m$ (where $f_m$ is the frequency of the input signal), and contains reactive elements whose characteristic values are not stable with temperature and drift as they age. In addition, a large number of exclusive-OR gates may be required in the exclusive-OR gate tree. For example, for the Davenport frequency multiplier to produce a signal which is $1+7/17$ times the frequency of the input frequency, the divide-by-N circuit must divide by $N=17$, and the multiply-by-M circuit must multiply by $M=24$. The tapped delay line must include 23 taps, and the exclusive-OR gate tree includes 5 layers of exclusive-OR gates totalling 23 exclusive-OR gates.

A frequency multiplier having a simplified structure, and not including reactive elements is desirable.

In accordance with principles of the present invention, a frequency multiplier, for producing an output signal having a frequency greater than the frequency of an input signal by a factor $(1+N/M)$, comprises: an input terminal and an output terminal; and a plurality of frequency multiplying stages, coupled between the input and output terminals, each producing an output signals having a frequency greater than the frequency of its input signal by a factor having the general form $(1+1/P)$.

The present inventor discovered that:

$$1 + \frac{N}{M} = \prod_{j=0}^{N-1}\left(1 + \frac{1}{M+j}\right) \tag{2}$$

That is, the general factor $1+N/M$ can be expressed as the product of N factors each of the general form $(1+1/P)$. Thus a serial connection of N circuits, (such as those illustrated in FIG. 1), each multiplying by a factor $(1+1/P)$ will perform the multiplication by a factor $(1+N/M)$.

In accordance with another aspect of the present invention, the number of frequency multiplier stages may be reduced.

The present inventor also discovered that:

$$1 + \frac{N}{M} = \left(1 + \frac{1}{M}\right)\left(1 + \frac{N-1}{M+1}\right) \tag{3}$$

The fraction $(N-1)/(M-1)$ may be reduced to its lowest terms in the usual manner according to the equation:

$$1 + \frac{N-1}{M+1} = 1 + \frac{(N-1)/i}{(M+1)/i} \quad (4)$$

where i is a factor common to both the numerator and the denominator. Preferably, i is the largest common factor of M and N.

In the most general case, equation (3) may be applied to result in a first factor having the general form $(1+1/P)$, and a second factor having the form $(1+N'/M')$, where $N'=N-1$ and $M'=M+1$. Equation (4) may be then be applied to the second factor so long as $N'$ and $M'$ have a common factor. If The resulting numerator of the second term is not 1, then equation (3) may be again applied, this time to the second factor. This results in two additional factors, the first having the general form $(1+1/P)$ and the second having the general form $(1+N'/M')$. This sequence of steps is repeated until a series of factors all having the general form $(1+1/P)$ results. The frequency multiplier may then be implemented by a corresponding series of frequency multiplier circuits as illustrated in FIG. 1.

Continuing the above example, to construct a frequency multiplier according to the present invention which multiplies an input signal by a factor of $1+7/17$, the following steps are followed. First, applying equation (3):

$$1+7/17 = 1+1/17 \times 1+6/18 \quad (5)$$

Then, applying equation (4), with $i=6$, to the second factor, $1+6/18$ gives:

$$1+3/9 = 1+1/3 \quad (6)$$

The resulting equivalent equation to equation (5) is:

$$1+7/17 = 1+1/17 \times 1+1/3 \quad (7)$$

A frequency multiplier for producing an output signal having a frequency greater than that of the input signal by a factor of $1+7/17$ requires two frequency multiplier stages as illustrated in FIG. 1. The first multiplies by a factor $1+1/17$ and includes a divide-by-17 circuit 120; and the second multiplies by a factor $1+1/3$ and includes a divide-by-3 circuit 120. The total circuitry, thus, includes 2 exclusive-OR gates, a divide-by-17 circuit, a divide-by-3 circuit, and two delay circuits which may be implemented by two inverters each. This compares to a divide-by-17 circuit, a 23 tap delay line and 23 exclusive-OR gates required by the Davenport frequency multiplier described above.

Figure 1:
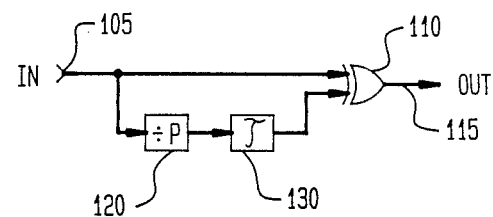
FIG. 1 is a logic diagram of a known frequency multiplier stage.
Figure 2:
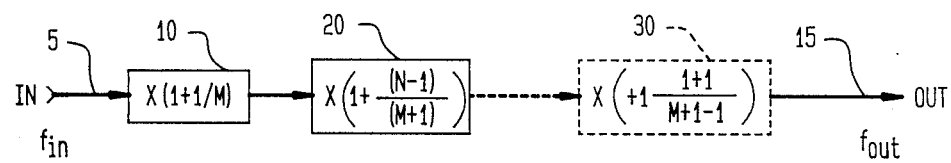
FIG. 2 is a block diagram of a frequency multiplier in accordance with the present invention which may be constructed of frequency multiplier stages illustrated in FIG. 1.

In FIG. 2, an input terminal 5 is coupled to a source (not shown) of an input signal having a frequency $f_{in}$. Input terminal 5 is coupled to an input terminal of a first frequency multiplier stage 10. An output terminal of the first frequency multiplier stage 10 is coupled to an input terminal of a second frequency multiplier stage 20. An output terminal of the last frequency multiplier stage 30 is coupled to an output terminal 15. Output terminal 15 is coupled to utilization circuitry (not shown) responsive to the output signal having a frequency $f_{out}=(1+N/M) f_{in}$. Additional frequency multiplier stages may follow (in sequence) the first and second multiplier stages. This is illustrated in phantom in FIG. 1 by a third frequency multiplier stage 30, having an input terminal coupled to the output terminal of the first frequency multiplier stage 10 and an output terminal coupled to the input terminal of the last frequency multiplier stage 30.

In operation, each frequency multiplier stage (10, 20, 30) produces a signal having a frequency greater than the frequency of the input signal by a factor having the general form $(1+1/P)$, where the respective factors P are selected according to the procedure described above. The frequency multiplier stages (10, 20, 30) may be coupled in any order between the input terminal 5 and output terminal 15. The signal produced at output terminal 15 has a frequency greater than the frequency of the signal at input terminal 5 by a factor $(1+N/M)$.

In general, as illustrated by equation (1), N frequency multiplier stages are required. A first stage multiplies the frequency by a factor $(1+1/M)$, the second by a factor $(1+1/(M+1))$, and so forth ending with the N-th multiplying by a factor $(1+1/(M+N-1))$.

Alternatively, the number of stages may be reduced by applying equations (3) and (4) appropriately, as required.

What is claimed is:

1. A frequency multiplier, for producing an output signal having a frequency greater than the frequency of an input signal by a factor $(1+N/M)$, where N and M are positive integers greater than 1, and $N \leq M$, comprising:

an input terminal and an output terminal; and a plurality of frequency multiplying stages, coupled in series between said input and output terminals, each stage having a stage input and a stage output, wherein each stage input is coupled to said input terminal or a stage output of a preceding stage, and each stage output is coupled to a stage input of a succeeding stage or said output terminal, and each stage including circuitry of a similar structure producing a stage output signal having a frequency greater than the frequency of its stage input signal by a stage multiplier factor having the general form $(1+1/P)$, where P is any positive integer greater than 1, wherein the series multiplication of the stage multiplier factors of said plurality of frequency multiplier stages produces the output multiplier factor $1+N/M$, and each stage multiplier factor corresponds to one factor or a subset of factors on the right hand side of the following series multiplication equation:

$$1 + N/M = \prod_{j=0}^{N-1} (1 + 1/(M+j)).$$

2. The frequency multiplier of claim 1, wherein at least one of said frequency multiplier stages comprises:

an input and an output terminal;

an exclusive-OR gate, having a first input terminal coupled to said input terminal, a second input terminal, and an output terminal coupled to said output terminal;

a divide-by-P circuit, having an input terminal coupled to said input terminal, and an output terminal; and a delay circuit, having an input terminal coupled to said output terminal of said divide-by-P circuit, and an output terminal coupled to said second input terminal of said exclusive-OR gate.

3. The frequency multiplier of claim 1, wherein said plurality of frequency multiplying stages comprises a number N of frequency multiplying stages each multiplying the frequency of their input signals by respective factors of:

$$1 + \frac{1}{M+j}$$

where j is an integer having respective values from 0 to N−1.

4. The frequency multiplier of claim 1, wherein said plurality of frequency multiplying stages comprises:

a first stage multiplying the frequency of its input signal by a factor $(1+1/M)$; and a remaining subset of said plurality of multiplying stages which, in combination, multiply the frequency of its input signal by a factor:

$$1+(N-1)/(M+1).$$

5. The frequency multiplier of claim 1, wherein said plurality of frequency multiplying stages comprises:

a first stage multiplying the frequency of its input signal by a factor $(1+1/M)$; and a remaining subset of said plurality of multiplying stages which, in combination, multiply the frequency of its input signal by a factor:

$$1+(N-1)/(M+1) = 1+N'/M'$$

where $N'=N-1$ and $M'=M+1$, and the multiplier factor of $(1+N'/M')$ is produced by a series multiplication in the form of the equation in claim 1 by a number of frequency multiplying stages reduced to a number less than N−1 when $N'$ and $M'$ have a common factor.

6. The frequency multiplier of claim 5, wherein said plurality of frequency multiplying stages comprises a first stage of a factor $(1+1/M)$ and a second stage of $(1+N'/M')$ when $N'$ is a highest common factor of $M'$.

* * * * *